United States Patent [19]

Shankland et al.

[11] Patent Number: 4,978,467

[45] Date of Patent: Dec. 18, 1990

[54] AZEOTROPE-LIKE COMPOSITIONS OF PENTAFLUOROETHANE AND DIFLUOROMETHANE

[75] Inventors: Ian R. Shankland, Williamsville; Earl A. E. Lund, West Seneca, both of N.Y.

[73] Assignee: Allied-Signal Inc., Morris Township, Morris County, N.J.

[21] Appl. No.: 412,974

[22] Filed: Sep. 26, 1989

[51] Int. Cl.$^5$ .......................... C11D 7/30; C11D 7/50
[52] U.S. Cl. ...................................... 252/69; 252/67; 252/162; 252/364; 252/DIG. 9; 62/114
[58] Field of Search ................ 252/162, 364, DIG. 9, 252/67, 69; 62/114; 203/67

[56] References Cited

U.S. PATENT DOCUMENTS

| | | | |
|---|---|---|---|
| 2,101,993 | 12/1937 | Fleischer | 62/178 |
| 2,641,579 | 6/1953 | Benning | 252/67 |
| 4,303,536 | 12/1981 | Orfeo et al. | 252/67 |
| 4,622,825 | 11/1986 | Larvo | 62/102 |
| 4,810,403 | 3/1989 | Bnons | 252/67 |

FOREIGN PATENT DOCUMENTS 1121392  5/1989  Japan .

OTHER PUBLICATIONS

R. C. Downing, Fluorocarbon Refrigerants Handbook, 17-43, 139-160, (1988).

T. Atwood, "NARBS—The Promise and the Problem Non Azeotrope Refrigerant" . . . American Society of Mechanical Engineers.

M. O. McLinden et al., "Methods for Comparing the Performance of Pure and Mixed Refrigerants in the Vapor Compression Cycle".

*Primary Examiner*—Paul Lieberman
*Assistant Examiner*—Kathleen Markowski
*Attorney, Agent, or Firm*—Colleen D. Szuch; J. P. Friedenson

[57] ABSTRACT

Azeotrope-like compositions of pentafluoroethane and difluoromethane useful for heating and cooling applications.

12 Claims, No Drawings

AZEOTROPE-LIKE COMPOSITIONS OF PENTAFLUOROETHANE AND DIFLUOROMETHANE

FIELD OF THE INVENTION

This invention relates to azeotrope-like compositions of pentafluoroethane and difluoromethane. These mixtures are useful as refrigerants for heating and cooling applications.

BACKGROUND OF THE INVENTION

Fluorocarbon based fluids have found widespread use in industry for refrigeration, air conditioning and heat pump applications.

Vapor compression is one form of refrigeration. In its simplest form, vapor compression involves changing the refrigerant from the liquid to the vapor phase through heat absorption at a low pressure and then from the vapor to the liquid phase through heat removal at an elevated pressure. First, the refrigerant is vaporized in the evaporator which is in contact with the body to be cooled. The pressure in the evaporator is such that the boiling point of the refrigerant is below the temperature of the body to be cooled. Thus, heat flows from the body to the refrigerant and causes the refrigerant to vaporize. The vapor formed is then removed by means of a compressor in order to maintain the low pressure in the evaporator. The temperature and pressure of the vapor are then raised through the addition of mechanical energy by the compressor. The high pressure vapor then passes to the condenser whereupon heat exchanges with a cooler medium. The sensible and latent heats are removed with subsequent condensation. The hot liquid refrigerant then passes to the expansion valve and is ready to cycle again.

While the primary purpose of refrigeration is to remove energy at low temperature, the primary purpose of a heat pump is to add energy at higher temperature. Heat pumps are considered reverse cycle systems because for heating, the operation of the condenser is interchanged with that of the refrigeration evaporator.

Certain chlorofluorocarbons have gained widespread use in refrigeration applications including air conditioning and heat pump applications owing to their unique combination of chemical and physical properties. The majority of refrigerants utilized in vapor compression systems are either single component fluids or azeotropic mixtures. Single component fluids and azeotropic mixtures are characterized as constant-boiling because they exhibit isothermal and isobaric evaporation and condensation. The use of azeotropic mixtures as refrigerants is known in the art. See, for example, R. C. Downing, "Fluorocarbon Refrigerants Handbook", pp. 139–158, Prentice-Hall, 1988, and U.S. Pat. Nos. 2,101,993 and 2,641,579.

Azeotropic or azeotrope-like compositions are desired because they do not fractionate upon boiling or evaporation. This behavior is desirable because in the previously described vapor compression equipment with which these refrigerants are employed, condensed material is generated in preparation for cooling or for heating purposes, and unless the refrigerant composition is constant boiling, i.e. is azeotrope-like, fractionation and segregation will occur upon evaporation and condensation and undesirable refrigerant distribution may act to upset the cooling or heating.

Non-azeotropic mixtures have been disclosed as refrigerants, see, e.g., U.S. Pat. No. 4,303,536, but have not found widespread use in commercial applications even though the ability of non-azeotropic refrigerant blends to exhibit improved thermodynamic performance has often been discussed in the literature. See, e.g., T. Atwood, "NARBS—The Promise and the Problem", American Society of Mechanical Engineers, Winter Annual Meeting, paper 86-WA/HT-61, 1986 and M. O. McLinden et al., "Methods for Comparing the Performance of Pure and Mixed Refrigerants in the Vapor Compression Cycle", *Int. J. Refrio.* 10, 318 (1987). Because non-azeotropic mixtures may fractionate during the refrigeration cycle, they require certain hardware changes. The added difficulty in charging and servicing refrigeration equipment is the primary reason that non-azeotropic mixtures have been avoided. The situation is further complicated if an inadvertent leak in the system occurs during such use or service. The composition of the mixture could change, affecting system pressures and system performance. Thus, if one component of the non-azeotropic mixture is flammable, fractionation could shift the composition into the flammable region with potential adverse consequences.

The art is continually seeking new fluorocarbon based azeotrope-like mixtures which offer alternatives for refrigeration and heat pump applications. Currently, of particular interest, are fluorocarbon based refrigerants which are considered to be environmetally acceptable substitutes for the fully halogenated chlorofluorocarbons. The latter are implicated in causing environmental problems associated with the depletion of the earth's protective ozone layer. Mathematical models have substantiated that partially halogenated species, such as pentafluoroethane (HFC-125) and difluoromethane (HFC-32), will not adversely affect atmospheric chemistry; being negligible contributors to stratospheric ozone depletion and global warming in comparison to the fully halogenated species.

The substitute materials must also possess those properties unique to the CFC's including chemical stability, low toxicity, non-flammability, and efficiency in-use. The latter characteristic is important, for example, in refrigeration applications like air conditioning where a loss in refrigerant thermodynamic performance or energy efficiency may produce secondary environmental effects due to increased fossil fuel usage arising from an increased demand for electrical energy. Furthermore, the ideal CFC refrigerant substitute would not require major engineering changes to conventional vapor compression technology currently used with CFC refrigerants.

It is accordingly an object of this invention to provide novel azeotrope-like compositions based on pentafluoroethane and difluoromethane which are useful in cooling and heating applications.

Another object of the invention is to provide novel environmentally acceptable refrigerants for use in the aforementioned applications.

Other objects and advantages of the invention will become apparent from the following description.

DESCRIPTION OF THE INVENTION

In accordance with the invention, novel azeotrope-like compositions have been discovered comprising pentafluoroethane and difluoromethane. The azeotrope-like compositions comprise from about 1 to about 50 weight percent pentafluoroethane and from about 50 to 99 weight percent difluoromethane which have a vapor pressure of about 119 psia (820 kPa) at 32° F. (0° C.). These compositions are azeotrope-like because they exhibit a maximum in the vapor pressure versus composition curve.

In a preferred embodiment of the invention, such azeotrope-like compositions comprise from about 5 to about 40 weight percent pentafluoroethane and from about 95 to about 60 weight percent difluoromethane. Vapor phase compositions containing in excess of about 35.7 weight percent pentafluoroethane were determined to be nonflammable in air at ambient conditions using the ASTM E-681 method as specified in the American Society of Heating, Refrigerating, and Air-Conditioning Engineers (ASHRAE) Standard 34. Compositions encompassing from about 35 to about 50 weight percent HFC-125 and from about 65 to about 50 weight percent HFC-32 are azeotrope-like and nonflammable.

Our best estimate of the true azeotropic composition is about 25 weight percent pentafluoroethane and about 75 weight percent difluoromethane, which has a vapor pressure of about 119 psia (820 kPa) at 32° F. (0° C.).

The most preferred azeotrope-like compositions of the invention have a vapor pressure of about 119 psia (820 kPa) at 32° F. (0° C.).

The term "azeotrope-like" is used herein for mixtures of the invention because in the claimed proportions, the compositions of pentafluoroethane and difluoromethane are constant boiling or essentially constant boiling.

All compositions within the indicated ranges, as well as certain compositions outside the indicated ranges, are azeotrope-like, as defined more particularly below.

From fundamental principles, the thermodynamic state of a fluid is defined by four variables: pressure, temperature, liquid composition, and vapor composition, or P-T-X-Y, respectively. An azeotrope is a unique characteristic of a system of two or more components where X and Y are equal at the stated P and T. In practice this means that the components cannot be separated during a phase change, and therefore are useful in the cooling and heating applications described above.

For the purposes of this discussion, by azeotrope-like composition is intended to mean that the composition behaves like a true azeotrope in terms of this constant boiling characteristics or tendency not to fractionate upon boiling or evaporation. Thus, in such system, the composition of the vapor formed during the evaporation is identical or substantially identical to the original liquid composition. Hence, during boiling or evaporation, the liquid composition, if it changes at all, changes only slightly. This is to be contrasted with non-azeotrope-like compositions in which the liquid and vapor compositions change substantially during evaporation or condensation.

If the vapor and liquid phases have identical compositions, then it can be shown, on a rigorous thermodynamic basis, that the boiling point versus composition curve passes through an absolute maximum or an absolute minimum at this composition. If one of the two conditions, identical liquid and vapor compositions or a minimum or maximum boiling point, are shown to exist, then the system is an azeotrope, and the other condition must follow.

One way to determine whether a candidate mixture is azeotrope-like within the meaning of this invention, is to distill a sample thereof under conditions (i.e., resolution—number of plates) which would be expected to separate the mixture into its separate components. If the mixture is non-azeotrope or non-azeotrope-like, the mixture will fractionate, i.e., separate into its various components with the lowest boiling component distilling off first, and so on. If the mixture is azeotrope-like, some finite amount of the first distillation cut will be obtained which contains all of the mixture components and which is constant boiling or behaves as a single substance. This phenomenon cannot occur if the mixture is not azeotrope-like, i.e., it is not part of an azeotrope system.

An equivalent method for determining whether a candidate mixture is azeotrope-like is to determine whether the boiling point versus composition curve passes through a maximum or minimum. Azeotropes which possess a minimum boiling point also possess a maximum in the vapor pressure curve at the same composition; as these blends exhibit positive deviations from Raoult's Law they are termed positive azeotropes. Similarly, those azeotropes which show a maximum boiling point exhibit a minimum in the vapor pressure curve and are termed negative azeotropes owing to the negative derivations from Raoult's Law.

It follows from the above that another characteristic of azeotrope-like compositions is that there is a range of compositions containing the same components in varying proportions which are azeotrope-like. All such compositions are intended to be covered by the term azeotrope-like as used herein. As an example, it is well known that at differing pressures the composition of a given azeotrope will vary at least slightly as does the boiling point of the composition. Thus, an azeotrope of A and B represents a unique type of relationship but with a variable composition depending on the temperature and/or pressure. As is readily understood by persons skilled in the art, the boiling point of an azeotrope will vary with the pressure.

Accordingly, another way to defining azeotrope-like within the meaning of this invention is to state that such mixtures exhibit vapor pressures within about ±5 psia (35 kPa) at 32° F. (0° C.) of the vapor pressure of the most preferred compositions disclosed herein (about 119 psia (810 kPa) at 32° F. (0° C.)). The preferred compositions exhibit vapor pressures within about ±2 psia (14 kPa) at 32° F. (0° C.).

In one process embodiment of the invention, the azeotrope-like compositions of the invention may be used in a method for producing refrigeration which comprises condensing a refrigerant comprising the azeotrope-like compositions and thereafter evaporating the refrigerant in the vicinity of the body to be cooled.

In another process embodiment of the invention, the azeotrope-like compositions of the invention may be used in a method for producing heating which utilizes condensing a refrigerant in the vicinity of the body to be heated and thereafter evaporating the refrigerant.

The pentafluoroethane and difluoromethane components of the novel azeotrope-like compositions of the invention are known materials. Preferably they should be used in sufficiently high purity so as to avoid the introduction of adverse influences upon the constant boiling properties of the system.

It should be understood that the present compositions may include additional components so as to form new azeotrope-like compositions. Any such compositions are considered to be within the scope of the present invention as long as the compositions are essentially constant boiling and contain all the essential components described herein.

The present invention is more fully illustrated by the following non-limiting Examples.

EXAMPLE 1

This example shows that a minimum occurs in the boiling point versus composition curve for the pentafluoroethane and difluoromethane system, confirming the existence of an azeotrope.

The temperature of boiling liquid mixture was measured using an ebulliometric technique similar to that described by W. Swietoslawski in Ebulliometric Measurements, p. 4, Reinhold Publishing Corp. (1945).

The ebulliometer was first charged with a weighed amount of difluoromethane. The system was brought to total reflux by gently warming the lower part of the ebulliometer. A carbon dioxide ice/methanol mixture was used to cool the condenser. The temperature of the boiling liquid was measured using a precision 25 ohm platinum resistance thermometer. The thermometer recorded the boiling point measurements with a precision of ±0.01° C. Boiling temperature and atmospheric pressure were recorded after steady-state had been attained. A weighed aliquot of pentafluoroethane was then introduced into the ebulliometer and the temperature and pressure recorded again after the attainment of steady-state. This process was repeated with additional aliquots of pentafluoroethane.

The following Table I lists the boiling point measurements at 745.2 mm Hg for various mixtures of pentafluoroethane and difluoromethane.

TABLE I

| Liquid Mixture | | |
| --- | --- | --- |
| Weight Percent Composition difluoromethane | Weight Percent Composition pentafluoroethane | Boiling Point (°C.) at 745.2 mm Hg |
| 100. | 0. | −51.2 |
| 90. | 10. | −51.89 |
| 85. | 15. | −51.89 |
| 75.5 | 24.5 | −50.89 |
| 62.7 | 37.3 | −50.15 |
| 56.6 | 43.4 | −49.60 |
| 41.5 | 58.5 | −49.47 |

The data summarized in Table I show a minimum in the boiling point versus composition curve, i.e., pentafluoroethane and difluoromethane form a positive azeotrope.

EXAMPLE 2

This example shows that certain pentafluoroethane and difluoromethane compositions exhibit essentially constant vapor pressures. The region of constant vapor pressure versus composition is used to define the constant boiling or azeotrope-like composition range.

Vapor pressure measurements were performed by preparing mixtures of HFC-125 and HFC-32 in an approximately 150 cubic centimeter vessel. The vessel, equipped with a magnetically driven stirrer and a 0-300 psia (2068 kPa) pressure transducer accurate to ±0.2%, was submerged in a constant temperature bath controlled to within ±0.05° F. (0.03° C.). The vapor pressure measurement was recorded once thermal equilibrium was attained. This procedure was repeated at different HFC-125 and HFC-32 compositions.

TABLE II

| | Vapor Pressure | |
| --- | --- | --- |
| Weight Percent pentafluoroethane | at 32° F. (0° C.) psia (kPa) | at 77° F. (25° C.) psi (kPa) |
| 0.0 | 119.1 (821.1) | 247.0 (1703.0) |
| 6.3 | 119.3 (822.5) | 247.2 (1704.4) |
| 9.6 | 119.2 (821.8) | 247.0 (1703.0) |
| 15.5 | 119.2 (821.8) | 247.1 (1703.7) |
| 34.2 | 118.8 (819.1) | 245.7 (1694.0) |
| 51.6 | 116.6 (803.9) | 241.2 (1663.0) |

TABLE II summarizes the results of these experiments.

Interpolation amongst the data listed in Table II indicates that the vapor pressure remains essentially constant to within 5 psia (34 kPa) from about 1 weight percent to about 50 weight percent pentafluoroethane, and from about 99 weight percent to about 50 weight percent difluoromethane i.e., this composition range is essentially constant boiling or azeotrope-like.

EXAMPLE 3

This example shows that certain HFC-125/HFC-32 blends are nonflammable.

Flammability measurements were performed using the ASTM E-681 technique modified according to ASHRAE Standard 34. Briefly, this technique involves preparing fluorocarbon/air gas mixtures to a total pressure of one atmosphere in a 5 liter spherical glass vessel, stirring the mixture with a magnetically driven propeller to ensure a uniform composition, and then attempting to ignite the mixture using an electrically activated kitchen match head as the ignition source. A ternary flammability diagram was mapped by preparing mixtures of HFC-125, HFC-32 and air by the method of partial pressures and then determining whether or not a flame would propagate as defined by ASTM E-681. The critical flammability composition, that is the composition of the HFC-125, HFC-32 blend which contains the maximum proportion of the flammable HFC-32, yet which does not exhibit flame limits in air, was determined in a graphical manner similar to that described by Haenni et al. in Industrial and Engineering Chemistry, Vol. 51, pp. 685–688 (1959). The critical flammability composition was found to be 64.3 weight percent HFC-32 and about 35.7 weight percent HFC-125. In other words blends of HFC-125 and HFC-32 containing 35.7 or more weight percent HFC-125 are nonflammable in all proportions in air at ambient conditions.

Pure HFC-32 was found, using the same apparatus, to exhibit flame limits from 12.6 to 33.4 volume percent in air. The azeotrope-like blends of HFC-125 and HFC-32 are less flammable then HFC-32 alone and, as a consequence of their azeotrope-like behavior, are non-segregating.

EXAMPLE 4

This example shows that azeotrope-like HFC-125/HFC-32 blends have certain performance advantages when compared to HFC-32 alone.

The theoretical performance of a refrigerant at specific operating conditions can be estimated from the thermodynamic properties of the refrigerant using standard refrigeration cycle analysis techniques, see for example, "Fluorocarbons Refrigerants Handbook", ch. 3, Prentice-Hall, (1988) by R. C. Downing. The coefficient of performance, COP, is a universally accepted measure, especially useful in representing the relative thermodynamic efficiency of a refrigerant in a specific heating or cooling cycle involving evaporation or condensation of the refrigerant. In refrigeration engineering this term expresses the ratio of useful refrigeration to the energy applied by the compressor in compressing the vapor. The capacity of a refrigerant represents the volumetric efficiency of the refrigerant. To a compressor engineer this value expresses the capability of a compressor to pump quantities of heat for a given volumetric flow rate of refrigerant. In other words, given a specific compressor, a refrigerant with a higher capacity will deliver more cooling or heating power.

We have performed this type of calculation for a medium to low temperature refrigeration cycle where the condenser temperature is typically 100° F. and the evaporator temperature is typically −50° to −10° F. We have further assumed isentropic compression and a compressor inlet temperature of 65° F. Such calculations were performed for a 80/20 by weight blend of HFC-32 and HFC-125 as well for 100 percent HFC-32. Table III lists the COP of the 80/20 blend of HFC-32 and HFC-125 relative to that of HFC-32 over a range of evaporator temperatures. In Table III the * indicates that COP and capacity are given relative to HFC-32.

TABLE III

| Evaporator Temperature (°F.) | Thermodynamic Performance Of 80/20 HFC-32/HFC-125 Blends | | | |
|---|---|---|---|---|
| | COP* | Capacity* | HFC-32 Discharge Temperature (°F.) | 32/125 Discharge Temperature(°F.) |
| −50.0 | 1.024 | 1.02 | 401.8 | 358.9 |
| −40.0 | 1.021 | 1.01 | 369.7 | 331.9 |
| −30.0 | 1.014 | 1.00 | 339.6 | 306.5 |
| −20.0 | 1.008 | 1.00 | 311.5 | 282.5 |
| −10.0 | 1.004 | 0.99 | 285.0 | 259.8 |

*Relative to HFC-32

The data listed in this table show that the 80/20 HFC-32/HFC-125 blend provides a modest improvement in COP compared to that attainable with HFC-32. It provides essentially the same refrigeration capacity, and also produces lower discharge temperatures from the compressor, which contributes to compressor reliability. i.e., lower compressor discharge temperatures are known in the art to result in more reliable compressor operation.

Azeotrope-like HFC-32/HFC-125 mixtures at greater HFC-125 compositions than the 20 weight percent used in this example also provide equivalent performance to HFC-32 and even lower compressor discharge temperatures.

Having described the invention in detail and by reference to preferred embodiments thereof, it will be apparent that modifications and variations are possible without departing from the scope of the invention defined in the appended claims.

What is claimed:

1. Azeotrope-like compositions comprising from about 1.0 to about 50.0 weight percent pentafluoroethane and from about 99.0 weight percent to about 50.0 weight difluoromethane which have a vapor pressure of about 119.0 psia at 32° F.

2. The azeotrope-like compositions of claim 1 consisting essentially of from about 5 weight percent to about 40.0 weight percent pentafluoroethane and from about 95.0 weight percent to about 60.0 weight percent difluoromethane.

3. Azeotrope-like compositions of claim 1 consisting essentially of about 25 weight percent pentafluoroethane and 75 weight percent difluoromethane.

4. Azeotrope-like compositions of claim 1 wherein said compositions have a vapor pressure of about 119 ± 5 psia at 32° F.

5. A method for producing refrigeration which comprises condensing a composition of claim 1 and thereafter evaporating said composition in the vicinity of a body to be cooled.

6. A method for producing heating which comprises condensing a composition of claim 1 in the vicinity of a body to be heated and thereafter evaporating said composition.

7. A method for producing refrigeration which comprises condensing a composition of claim 3 and thereafter evaporating the said composition in the vicinity of a body to be cooled.

8. A method for producing heating which comprises condensing a composition of claim 3 in the vicinity of a body to be heated and thereafter evaporating said composition.

9. A method for producing refrigeration which comprises condensing a composition of claim 5 and thereafter evaporating said composition in the vicinity of a body to be cooled.

10. A method for producing heating which comprises condensing a composition of claim 5 in the vicinity of a body to be heated and thereafter evaporating said composition.

11. A method for producing refrigeration which comprises condensing a composition of claim 7 and thereafter evaporating said composition in the vicinity of a body to be cooled.

12. A method for producing heating which comprises condensing a composition of claim 7 in the vicinity of a body to be heated and thereafter evaporating said composition.

* * * * *

UNITED STATES PATENT AND TRADEMARK OFFICE
CERTIFICATE OF CORRECTION

PATENT NO. : 4,978,467
DATED : December 18, 1990
INVENTOR(S) : I.R. Shankland and E.A.E. Lund It is certified that error appears in the above-identified patent and that said Letters Patent is hereby corrected as shown below:

Column 7:
In claim 1, line 1, "comprising" should read "consisting essentially of".

Signed and Sealed this

Twentieth Day of October, 1992

Attest:

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO : 4,978,467
DATED : December 18, 1990
INVENTOR(S): Shankland, et. al.

It is certified that error appears in the above-identified patent and that said Letters Patent are hereby corrected as shown below:

Claim 7, line 2, delete "3" and substitute --2--.

Claim 8, line 2, delete "3" and substitute --2--.

Claim 9, line 2, delete "5" and substitute --3--.

Claim 10, line 2 delete "5" and substitute --3--.

Claim 11, line 2, delete "7" and substitute --4--.

Claim 12, line 2, delete "7" and substitute --4--.

Signed and Sealed this

Tenth Day of March, 1998

*Attest:*

*Attesting Officer*

BRUCE LEHMAN
*Commissioner of Patents and Trademarks*